United States Patent [19]
Pfarrer et al.

[11] 4,041,542
[45] * Aug. 9, 1977

[54] CONTROL APPARATUS FOR TWO-SPEED COMPRESSOR

[75] Inventors: David M. Pfarrer, Hurst; Sidney A. Parker, Fort Worth, both of Tex.

[73] Assignee: Lennox Industries, Inc., Marshalltown, Iowa

[ * ] Notice: The portion of the term of this patent subsequent to Jan. 27, 1993, has been disclaimed.

[21] Appl. No.: 610,530

[22] Filed: Sept. 5, 1975

Related U.S. Application Data

[62] Division of Ser. No. 436,179, Jan. 24, 1974, Pat. No. 3,935,519.

[51] Int. Cl.² .............................................. H02H 7/08
[52] U.S. Cl. ................................ 361/27; 318/224 R; 318/471
[58] Field of Search ................. 317/13 C, 13 B, 13 R, 317/42; 318/224, 305, 471

[56] References Cited
U.S. PATENT DOCUMENTS

| | | | |
|---|---|---|---|
| 2,782,353 | 2/1957 | Seely | 317/13 B X |
| 3,070,734 | 12/1962 | Rawcliffe | 318/224 R |
| 3,249,816 | 5/1966 | Courtin et al. | 317/13 C X |
| 3,329,869 | 7/1967 | Obenhaus | 317/13 C |
| 3,404,313 | 10/1968 | Happel et al. | 317/13 C X |
| 3,416,060 | 12/1968 | Evalds | 317/42 X |
| 3,555,356 | 1/1971 | Kaiser | 317/13 C |
| 3,585,451 | 6/1971 | Day | 317/13 C |
| 3,761,794 | 9/1973 | Quinlisk, Jr. et al | 317/13 B X |
| 3,819,996 | 6/1974 | Habisohn | 318/224 |
| 3,935,519 | 1/1976 | Pfarrer et al. | 317/40 R X |

*Primary Examiner*—J D Miller
*Assistant Examiner*—Patrick R. Salce
*Attorney, Agent, or Firm*—Allegretti, Newitt, Witcoff & McAndrews

[57] ABSTRACT

The disclosure describes a refrigerant compressor of the type driven by a motor capable of operating at a low speed and a high speed, the motor including first, second and third stator coils. First, second and third temperature sensors are located adjacent the first, second and third stator coils, respectively, for detecting any change in temperature of the coils. If the temperature of any of the stator coils exceeds a predetermined value, a control device operates a switch in a pilot circuit that turns off the motor before damage from excessive heat can occur. A unique contactor assembly utilizing both electrical and mechanical interlocks interconnects the stator coils to provide two speed operation.

2 Claims, 7 Drawing Figures

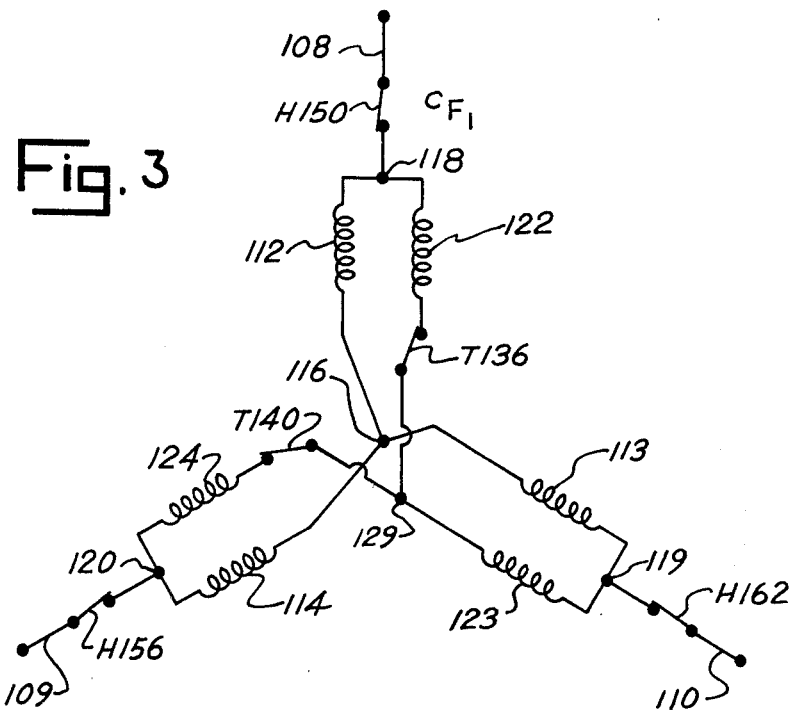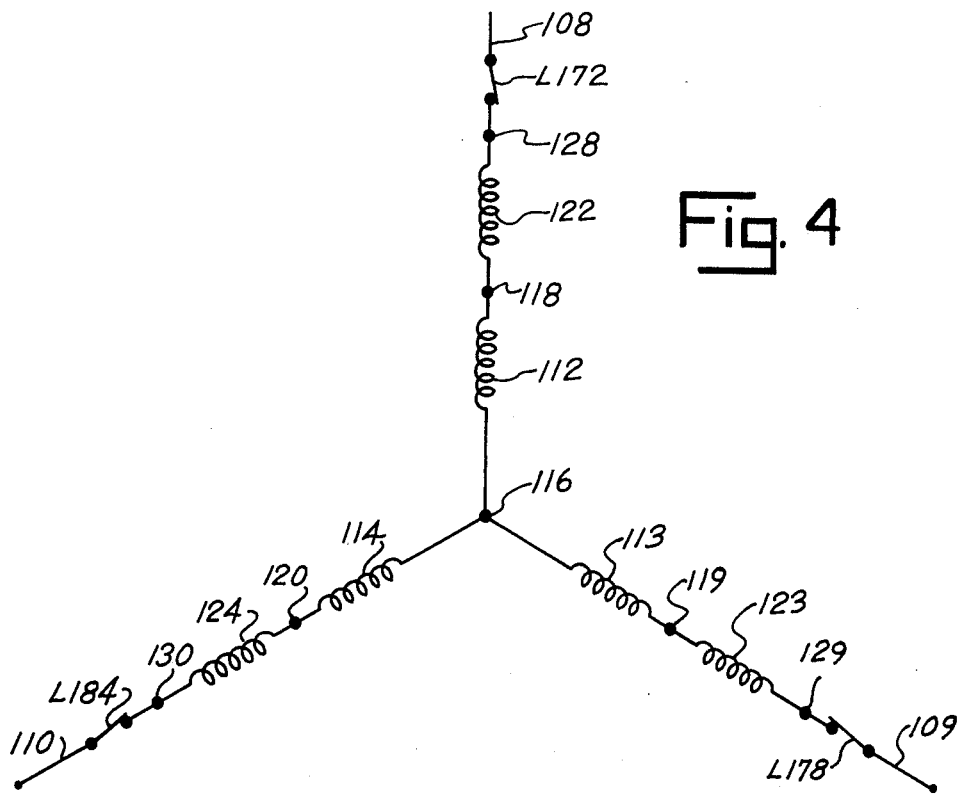

CONTROL APPARATUS FOR TWO-SPEED COMPRESSOR

This is a division of application Ser. No. 436,179 filed Jan. 24, 1974, now U.S. Pat. No. 3,935,519.

BACKGROUND AND SUMMARY OF THE INVENTION

This invention relates to refrigerant compressors driven by an electrical motor, and more particularly relates to means for controlling a refrigerant compressor utilizing a two-speed electrical motor.

Refrigerant compressors utilizing a two-speed compressor motor have been devised in the past. One such arrangement is shown in U.S. Pat. No. 3,584,980 (Cawley et al. — June 15, 1971). Although a two speed compressor results in improved performance, the applicants have discovered that such an arrangement requires precise control in order to prevent damage to the compressor motor during two speed operation.

Compressor motors adapted to operate from a three phase source of electrical power generally comprise at least one stator coil for each of the electrical phases. The applicants have found that each of these coils must be protected from thermal damage in order to ensure long motor life. Since thermal damage can occur rapidly under certain adverse operating conditions, the coils must be protected by sensitive temperature detectors capable of rapid response.

Although one temperature sensor placed adjacent one of the coils will tend to provide protection against thermal destruction due to a locked rotor or running overload, a single sensor or dual sensors will not give adequate primary and secondary single phasing protection. The applicants have discovered that protection is enhanced by providing a sensor for each of the phase windings or coils in a multiphase motor. These sensors provide an indication of the temperature adjacent each coil associated with a different phase of electrical power. If one of the sensors indicates an abnormally high temperature in an associated stator coil, control means operate a switch in a motor pilot circuit in order to remove all electrical power from the motor. In this manner, the apparatus provides primary and secondary single phasing protection, along with locked rotor and running overload protection.

Accordingly, it is an object of the present invention to provide a refrigerant compressor in which a motor adapted to operate on multiphase electrical power has a temperature sensor located adjacent each motor coil associated with a different phase of the electrical power, so that each coil in the motor is adequately protected against thermal damage.

It is still another object of the invention to provide control apparatus of the foregoing type in which a control device interrupts power to the motor if any one of the sensors detects an abnormally high temperature in any of the motor coils.

The applicants have also discovered that the control of a two-speed compressor motor requires careful design of the contactors used to switch from a high speed mode of operation to a low speed mode of operation and vice versa. In a compressor motor adapted to be operated from multi-phase electrical power, multiple stator coils are frequently provided and must be interconnected in different ways in order to achieve different speeds of operation.

The applicants have discovered that the interconnection of the coils must be achieved prior to the application of electrical power to the coils in order to avoid power surges and thermal damage to the motor. In addition, the applicants have invented a unique system of electrically and mechanically interlocking the contactors required for two-speed operation in order to assure a failsafe system of operation.

Accordingly, it is another object of the present invention to provide control apparatus for a two-speed compressor motor in which the coils in the motor are interconnected before any power is applied to the coils.

It is still another object of the present invention to provide motor control apparatus of the foregoing type in which both mechanical electrical interlocks are operated by and simultaneously with the contactors controlling the two-speed operation of the motor.

DESCRIPTION OF THE DRAWINGS

These and other objects, advantages and features of the present invention will hereafter appear in connection with the accompanying drawings wherein:

FIG. 3 is a fragmentary electrical schematic diagram showing the manner in which the stator coils shown in FIG. 2 are interconnected for high speed operation;

FIG. 4 is a fragmentary electrical schematic diagram showing the manner in which the stator coils shown in FIG. 2 are interconnected for low speed operation;

DESCRIPTION OF THE PREFERRED EMBODIMENT

Figure 1:
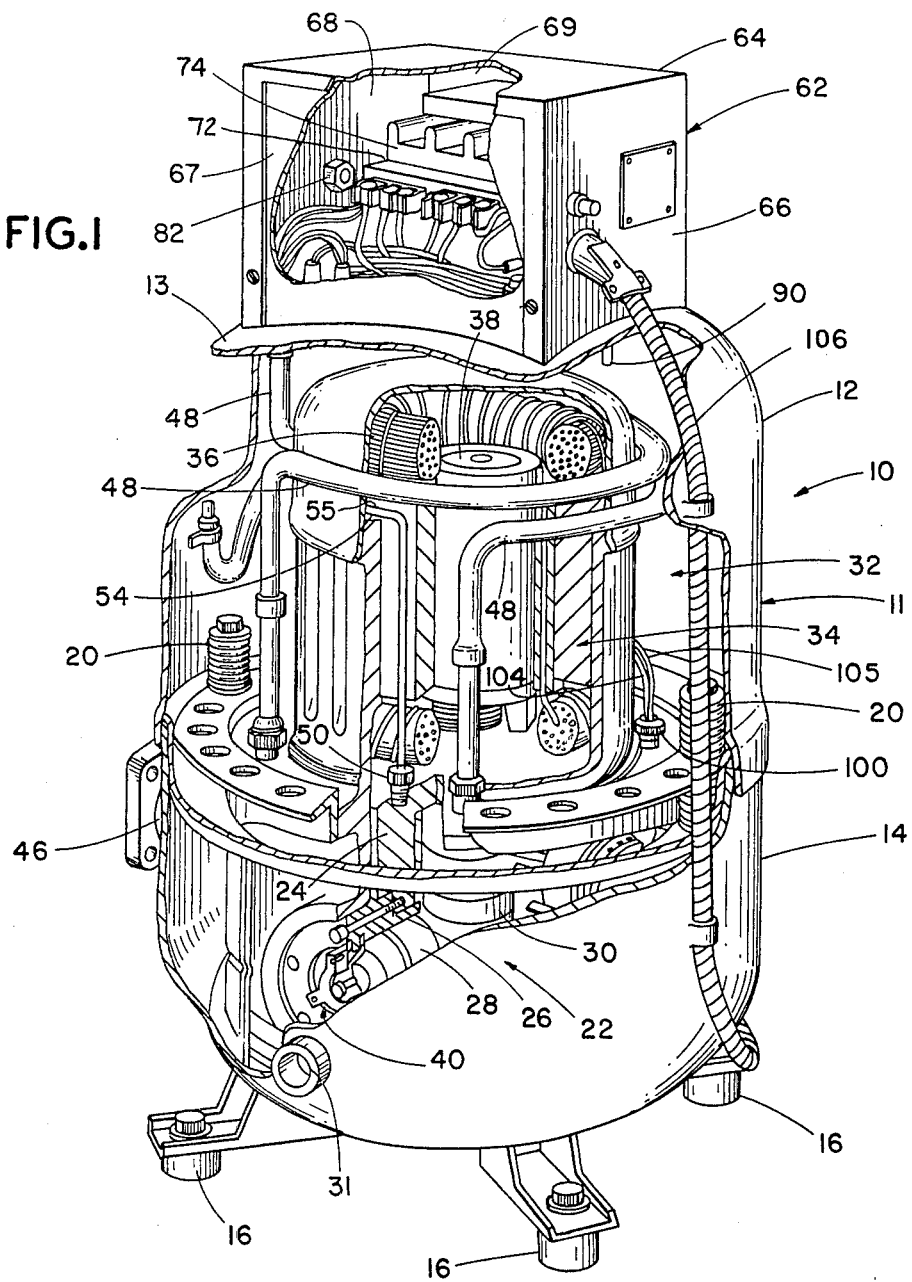
FIG. 1 is an isometric, fragmentary, partially cross-sectional view of a refrigerant compressor and motor embodying control apparatus made in accordance with the present invention.

Referring to FIG. 1, there is illustrated a refrigerant compressor 10 embodying a preferred form of the present invention. Compressor 10 comprises a sealed outer casing 11 which includes an upper shell 12 (having a top surface 13) that is welded to a lower shell 14. A plurality of legs 16 are suitably secured to compressor 10 to support it in an upright position.

Resiliently supported within the outer casing by resilient coil spring means 20 is a compression mechanism 22. The compression mechanism comprises a compressor block 24 which defines a cylinder 26, together with additional cylinder (not shown). A movable piston 28 reciprocates within cylinder 26 in order to compress a refrigerant vapor. Additional pistons, like piston 28, reciprocate in the additional cylinders, not shown. Each of the pistons is driven from a vertically-disposed drive shaft 30. The lower portion of the outer casing forms an oil sump in which the oil level is visible through an oil sight glass 31.

An electrical motor 32 is used to drive compression mechanism 22. The motor comprises a stator 34 which includes windings 36. A rotatable rotor 38 is inductively coupled to stator 34 and is mechanically coupled to drive shaft 30.

Provided at the end of each cylinder, including cylinder 26, and closing the end of each cylinder cavity, is a valve assembly, such as a valve assembly 40. The valve assembly includes a discharge valve and a suction valve. The suction valve opens on the suction stroke of piston 28 to permit refrigerant gas (suction gas) to enter cylinder 26 through a suction line 46. On the compression stroke of piston 28, the suction valve closes and the discharge valve opens to permit the flow of compressed refrigerant gas to a discharge muffler in the compression mechanism and then to discharge lines 48. The compressed gas is transmitted through the discharge lines to a conventional condensor (not shown).

A thermal density sensor 50 is located inside outer casing 11. The sensor comprises a thermostat which is screwed into compressor block 24 in the position shown in FIG. 1. The thermostat is preferably the same type of temperature limiting device shown in U.S. Pat. No. 3,278,111 (Parker — Oct. 11, 1966) in which switch contacts 58 (FIG. 2) and a temperature responsive element are contained within a single housing. Sensor 50 is set to open electrical contacts 58 at about 22° F., plus or minus 3° F., and to close contacts 58 at about 32° F, plus or minus 3° F. Contacts 58 are electrically connected to sensor 50 by conductors 54 and 55. Sensor 50 prevents the start up of motor 32 when the temperature of the running parts of the compression mechanism is below a predetermined value which inhibits adequate lubrication.

As shown in FIG. 1, a control box assembly 62, which comprises a top 64 and sidewalls 66-69, is physically coupled to top surface 13 of outer casing 11. An electrical control assembly 72, contained within control box 62, includes a contactor 74, as well as compressor terminals.

Control assembly 72 also comprises a high pressure switch assembly 82 located in the discharge gas spud on the exterior of the outer casing. Switch contacts 84 (FIG. 2) are contained within assembly 82.

Figure 2:
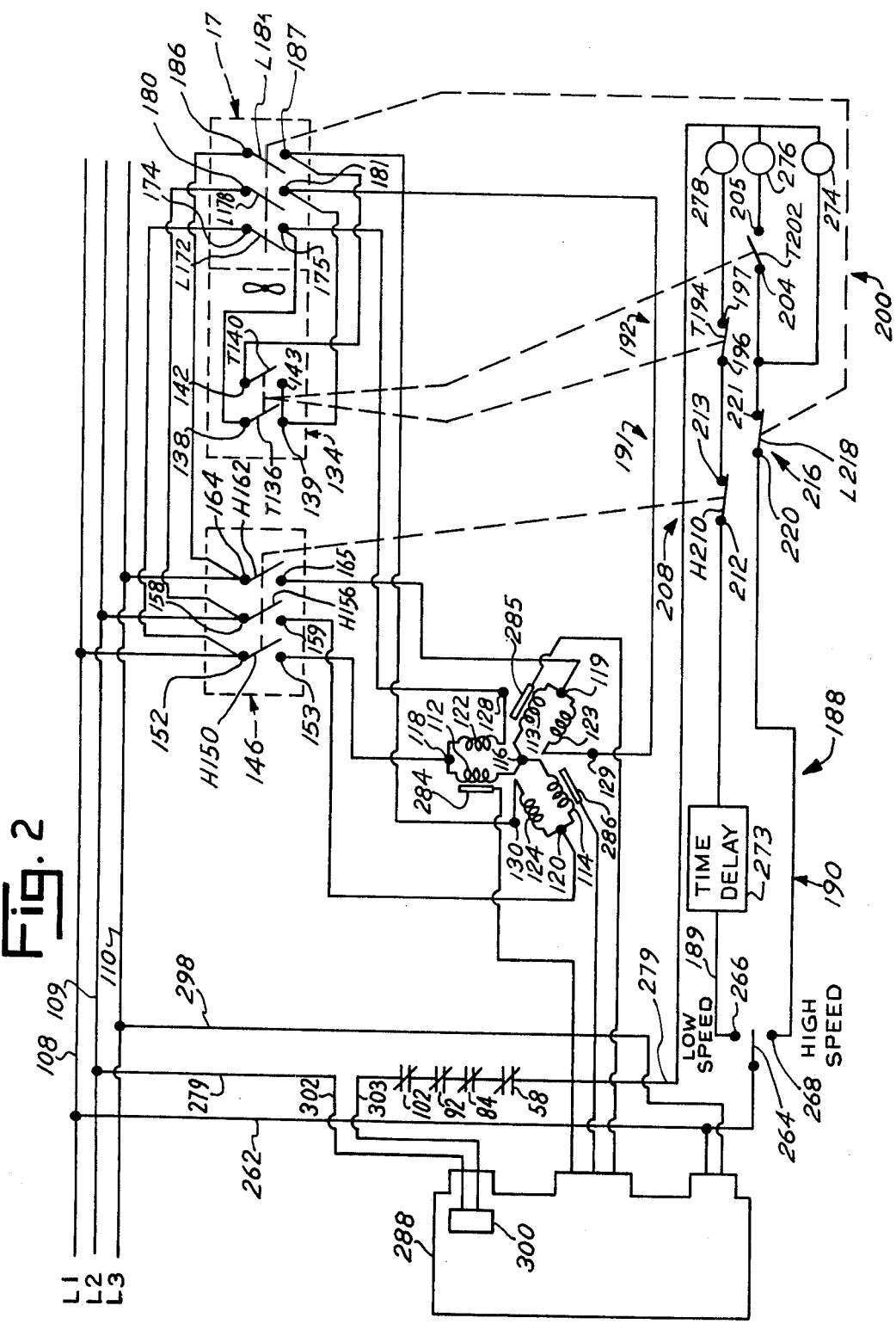
FIG. 2 is an electrical schematic diagram showing a preferred form of pilot circuit and contactor control circuit made in accordance with the present invention.

The control assembly also includes a low pressure switch assembly 90 that incorporates switch contacts 92 (FIG. 2). The switch contacts are connected in the motor pilot circuit as shown in FIG. 2.

Control assembly 72 further comprises a discharge gas temperature sensor 100 which is the same type of device as sensor 50 described above. Sensor 100 includes a set of switch contacts 102 (FIG. 2) which are connected to the sensor by conductors 104 and 105. The discharge gas temperature sensor senses discharge gas temperature as its source so as to terminate compressor motor operation if the discharge gas temperature exceeds a predetermined high value (on the order of 300° F) to prevent breakdown of the compressor oil and damage to the running parts of the compression mechanism.

In operation, each of the switches 58, 84, 92 and 102 shown in FIG. 2 must be in a closed circuit condition in order for motor 32 to be operated. If the temperature of the running parts of the compression assembly, for example, the drive shaft, piston, rods, and wrist pin, is too low, thermal density sensor 50 opens switch contacts 58, thereby preventing motor 32 from starting up and damaging the compression mechanism. If high pressure switch assembly 82 detects pressure above approximately 410 PSIG in discharge lines 48, switch contacts 84 are open circuited or opened to stop motor 32. Likewise, if a temperature above approximately 300° F in the discharge manifold is detected by discharge gas temperature sensor 100, switch contacts 102 are opened to stop motor 32. In a similar manner, if low pressure switch assembly 90 detects pressure below approximately 25 PSIG inside outer casing 11, switch contacts 92 are opened in order to stop motor 32.

Referring to FIGS. 1 and 2, three phase electrical power is supplied to stator coils 36 through a shielded cable 106 and over conductors 108-110. Stator coils 36 comprise inner coils 112-114 which are joined at a common end point 116 and which also are provided with terminals 118-120, respectively. The stator coils further includes outer coils 122-124 which terminate in terminals 128-130, respectively. Each of inner coils 112-114 and outer coils 122-124 is wired to accept a different phase of electrical power from three phase power conductors 108-110, respectively.

Referring to FIG. 2, electrical control assembly 72 also comprises a tying contactor 134 which is used to interconnect stator coils 36 for high speed operation when energized. The tying contactor comprises a switch arm T136 which movably operates between terminals 138, 139 and a switch arm T140 which movably operates between terminals 142 and 143.

In order to operate motor 32 at the high speed, a high speed contactor 146 is provided. As shown in FIG. 2, the contactor includes a switch arm H150 that movably operates between terminals 152, 153, a switch arm H156 which movably operates between terminals 158, 159, and a switch arm H162 which movably operates between terminals 164 and 165.

Figure 6:
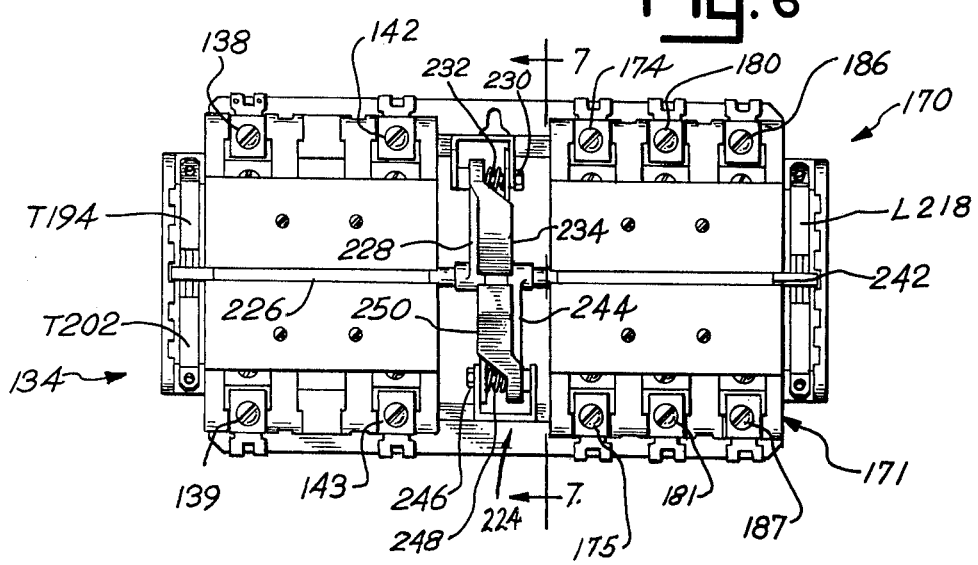
FIG. 6 is a top plan view of a preferred form of contact or made in accordance with the present invention.

Referring to FIGS. 2 and 6, a low speed contactor 170 is used to operate motor 32 at low speed. The contactor comprises a body 171, a switch arm L172 which movably operates between terminals 174, 175, a switch arm L178 that movably operates between terminals 180, 181, and a switch arm L184 that movably operates between terminals 186 and 187.

Each of the above described switch arms T136, T140, H150, H156, H162, L172, L178 and L184 is normally open in the manner shown in FIG. 2.

Control assembly 72 also includes a pilot control circuit 188 that has a low speed branch 189 for operating motor 32 at low speed and a high speed branch 190 for operating motor 32 at high speed.

Within pilot control circuit 188 is included an electrical interlock assembly 191. Referring to FIG. 2, the electrical interlock assembly comprises a normally-closed tying interlock switch 192 having a switch arm T194 that is movably operated between terminals 196 and 197. A normally open tying interlock switch 200 includes a switch arm T202 that is movably operated between terminals 204 and 205. A normally closed high-speed interlock switch 208 includes a switch arm H210 that is movably operated between terminals 212 and 213, and a normally closed low speed interlock switch 216 includes a switch arm L218 that is movably operated between terminals 220 and 221. As indicated in FIG. 2, tying interlock switch arms T194 and T202 are physically ganged to tying contactor switch arms T136 and T140. Likewise, switch arm H210 is physically ganged to high speed contactor switch arms H150, H156 and H162, and low speed interlock switch arm L218 is physically ganged to low speed contactor switch arms L172, L178 and L184.

Referring to FIG. 6, interlocking of the contactors is also achieved by a mechanical interlock assembly 224.

Figure 7:
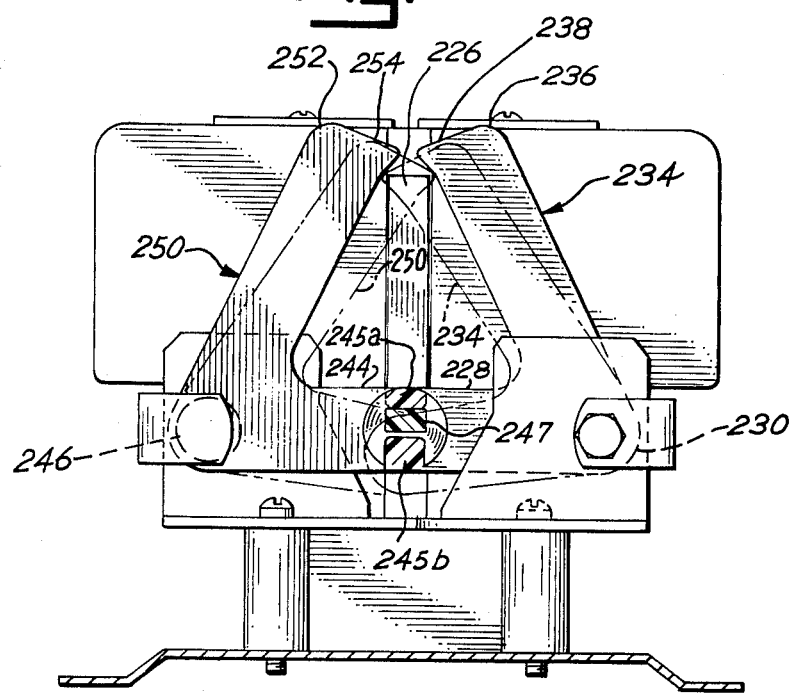
FIG. 7 is a cross-sectional view taken along line 7—7 in FIG. 6.

The tying contactor switch arms, as well as tying interlock switch arms T194 and T202 are each operated by a tying plunger 226 that is lowered by an arm 228 rotatably mounted on a pivot rod 230. A coil spring 232 biases the plunger in an upward direction as shown in FIG. 7. An interlock finger 234 having an upper surface 236 and a side face 238 extends above pivot rod 230 in order to interlock the tying contactor and the low speed contactor.

The mechanical interlock assembly also includes a low speed plunger 242 which operates the low speed contactor switch arms, as well as interlock switch arm L218. The plunger is operated in a vertical direction by an arm 244 that is rotatably mounted to a pivot rod 246. Arm 244 terminates in opposed 245a, 245b into which an extending FIG. 247 is fitted. FIG. 247 is integrally formed with plunger 242. The plunger is biased in an upward direction (as shown in FIG. 6) by a coil spring 248. An interlock finger 250 having an upper surface 252 and a side face 254 extends above pivot rod 246 in order to cooperate with interlock finger 234.

Referring to FIG. 2, the pilot control circuit also includes a conductor 262 which conducts AC current to a speed switch arm 264 that is movable between a low speed terminal 266 and a high speed terminal 268. The low speed branch of the circuit includes a conventional 2 second time delay device 273 as well as a low speed relay coil 278. The high speed branch of the circuit includes a tying relay coil 274 and a high speed relay coil 276 connected as shown.

In order to operate the control assembly, conductors 108–110 are connected to a three phase source of AC voltage, and speed switch arm 264 is moved to the desired speed terminal. Assuming switch arm 264 is placed in contact with high speed terminal 268 and that current is conducted through return conductor 279 by switch contacts 58, 84, 92 and 102, the normally-closed switch arm L218 conducts current through tying relay coil 274. As soon as relay coil 274 is energized, plunger 226 is lowered so that switch arms T136 and T140 are closed, interlock switch arm T194 is opened, and interlock switch arm T202 is closed. This is an important feature, since it interconnects stator coils 36 for high speed operation before power is applied to the coils. This mode of operation prevents transient or circulating currents which could be caused by the application of power before the tying of and interconnecting of the coils is completed. As plunger 226 moves downward, interlock finger 234 moves to the position shown in phantom in which upper surface 236 moves into the path of low speed interlock finger 250, thereby physically preventing low speed plunger 242 from closing low speed switch arms L172, L178, and L184 (FIGS. 6 and 7). In addition, the opening of switch arm T194 electrically prevents the energization of low speed relay coil 278.

As soon as switch arm T202 is closed, high speed relay coil 276 is energized and closes high speed switch arms H150, H156 and H162 so that three phase AC power is applied to the stator coils. The interconnections made by the energization of relay coils 274 and 276 is shown in FIG. 3. High speed interlock switch H210 arm opens, also preventing low speed coil 278 from being energized as did switch arm T194. The high speed switch arms may be operated by a contactor similar to the one shown in FIGS. 6 and 7. As soon as these connections are made, the motor begins to turn at its high speed rate.

Assuming that speed switch arm 264 is moved into contact with low speed terminal 266, time delay device 273 allows current to flow in low speed branch 189 after a two second delay. Current passes through the normally closed switch arms H210 and T194 in order to energize low speed relay coil 278. The energization of relay coil 278 causes low speed plunger 242 to move downward (as seen in FIG. 6) so that low speed switch arms L172, L178 and L184 are closed and low speed interlock switch arm L218 is opened. At the same time, upper surface 252 of interlock finger 250 moves to the position shown in phantom to pervent interlock finger 234 from lowering the tying plunger 226, thereby preventing tying switch arms T136 and T140 from closing. As a result, relay coils 274 and 276 are physically prevented from being energized. In addition, the opening of switch arm L218 electrically prevents the relay coils from being energized. As soon as the low speed switch arms in low speed contactor 170 are closed, the connections shown in FIG. 4 are completed so that motor 32 rotates at its low rate of speed.

Figure 5:
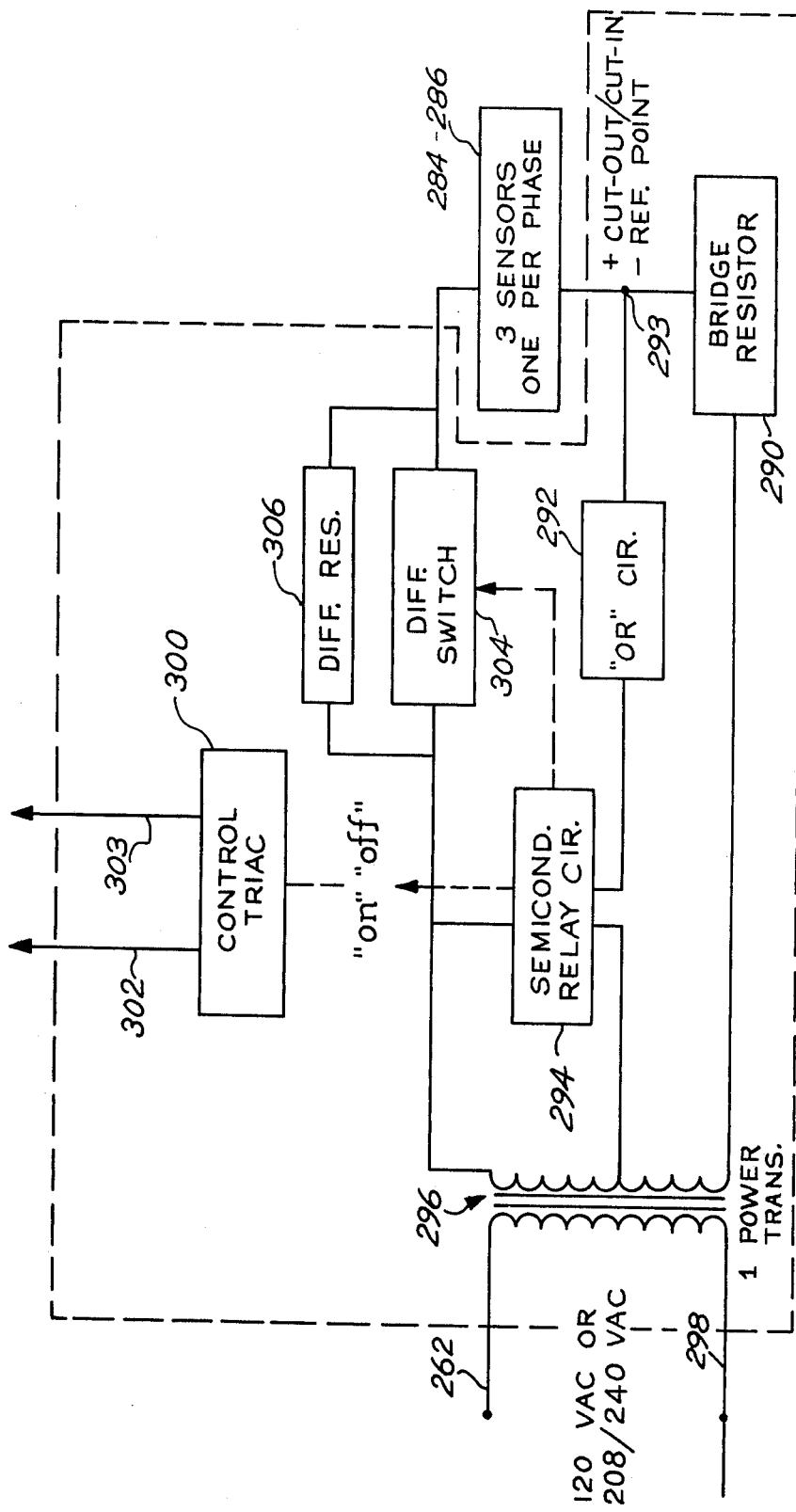
FIG. 5 is an electrical schematic block diagram of the motor protection module illustrated in FIG. 2.

Referring to FIGS. 2 and 5, stator coils 236 are protected from excessive temperatures by a motor protection assembly 282. The assembly includes sensors 284–286 that are preferably embedded in stator coils 112–114, respectively. If the sensors cannot be embedded in stator coils 112–114, they may be placed adjacent to coils 112–114 but in definite thermal contact. Applicants have found that contact between sensors and coils 122–124 only will not provide satisfactory protection from overheat should the tie contactor 134 fail in the open position while compressor 10 is operating at high speed. The sensors have a positive or negative temperatures coefficient of resistance so that, as the stator coils heat up, the resistance of the sensors changes. The resistance change with temperature may be linear or non-linear.

The sensors are used to provide temperature information for a solid state motor protection module 288. The motor protection module may be a solid state device, such as a Robert Shaw model MP23 "Statorstal Motor Protector". This device is shown in more detail in FIG. 5.

Module 288 includes a bridge resistor 290 that is used as one leg of a bridge, the other leg comprising the sensors 284–286. The sensor resistors and bridge resistor are wired together in a bridge configuration which controls an OR gate 292. If the reference point 293 at the junction between the bridge resistor and the sensors is negative, a current flows through OR circuit 292 to energize a semiconductor relay circuit 294. Power is supplied to the relay circuit through a transformer 296 and single phase power conductor 262 and 298. Relay circuit 294 controls a triac 300 that is connected to pilot circuit conductor 297 over conductors 302 and 303. Relay circuit 294 also controls a differential swithc 304 and a differential resistor 306 that can be switched into the bridge circuit.

During normal running conditions, the resistance of sensors 284–286 is lower than the resistance of bridge resistor 290. In this case, the bridge is unbalanced and reference point 293 is positive so that no current flows through OR circuit 292. Under these conditions, relay circuit 294 is energized so that triac 300 is switched to its conductive state. In its conductive state, triac 300 enables current to flow through conductor 279 in the pilot circuit so that relay coils 274, 276 and 278 may be energized. When relay circuit 294 is energized, differential switch 304 is closed and differential resistor 306 is shorted out of the bridge circuit comprising sensors 284-286 and bridge resistor 290.

As the stator coils heat up, sensors 284-286 also heat up and their resistance increases. If the sensor resistance exceeds the module cut out valve, the bridge becomes balanced so that reference point 293 is switched to a negative polarity and current flows through OR circuit 292 in order to de-energize semi-conductor relay circuit 294. As soon as relay circuit 294 is de-energized, triac 300 is switched to its non-conductive state so that current can no longer flow through conductor 279. As a result, the pilot control circuit returns each of contactors 134, 146 and 170 to its open circuit condition so that the motor is turned off. At the same time relay circuit 294 is de-energized, differential switch 304 opens so that differential resistor 306 is connected in series with sensors 284-286. This increases the unbalance of the bridge so that OR circuit 292 prevents current from flowing to relay circuit 294 until the resistance in the sensors drops below the cut in value.

As soon as the stator coils have cooled, the sensor temperature and resistance drop in value until the combined resistance of sensors 284-286 and differential resistor 306 is less than the resistance of bridge resistor 290. At this point in time, the bridge circuit is unbalanced in the opposite direction so that the polarity of junction 293 is again switched positive. As a result, OR circuit 292 conducts current, relay circuit 294 is energized and triac 300 again is switched to its conductive state. At this point in time, motor 32 again begins to rotate.

Those skilled in the art will recognize that only a preferred embodiment has been described herein and that the embodiment may be modified and altered without departing from the true spirit and scope of the invention as defined in the accompanying claims.

What is claimed is:

1. In a refrigerant compressor of the type having a compression mechanism for receiving refrigerant gas from a suction line, compressing the refrigerant gas and discharging the compressed refrigerant gas through a discharge line, and a motor for rotating shaft means in the compression mechanism at low speed and at high speed from a source of three-phase electrical power including first, second and third power terminals, said motor including a first stator coil, a second stator coil and a third stator coil adapted to receive three-phase electrical power, each stator coil having an inner end point connected to a common conductor and also having an outer end point, improved control apparatus for protecting the stator coils comprising:

a fourth stator coil having a second end point and also having a first end point connected to the outer end point of the first stator coil;
a fifth stator coil having a second end point and also having a first end point connected to the outer end of the second stator coil;
a sixth stator coil having a second end point and also having a first end point connected to the outer end point of the third stator coil;
first sensor means located adjacent the first coil for indicating a change in temperature of the first coil;
second sensor means located adjacent the second coil for indicating a change in temperature of the second coil;
third sensor means located adjacent the third coil for indicating a change in temperature of the third coil;
first control means for interrupting the flow of current to said stator coils in response to an indication from any of said sensor means that the temperature of any of said stator coils exceeds a predetermined value;
second control means for interconnecting the second end points of the fourth, fifth and sixth stator coils, for connecting the outer end point of the first stator coil to the first power terminal, for connecting the outer end point of the second stator coil to the second power terminal and for connecting the outer end point of the third stator coil to the third power terminal, whereby the motor rotates at high speed; and
third control means for connecting the second end point of the fourth stator coil to the first power terminal, for connecting second end point of the fifth stator coil to the second power terminal and for connecting the second end point of the sixth stator coil to the third power terminal, whereby the motor rotates at low speed.

2. Apparatus, as claimed in claim 1, wherein the first control means comprises:
a bridge resistor;
means for connecting the bridge resistor and the first, second and third sensor means in a bridge circuit configuration to form a junction between the bridge resistor and one of the sensor means;
bias means for biasing the bridge configuration so that the junction has a first polarity when the first, second and third stator coils are below a predetermined temperature and the junction has a second polarity when any of the first, second or third stator coils is above a predetermined temperature; and
means for interrupting the flow of current to all the stator coils in response to the second polarity of said junction.

* * * * *